United States Patent
Xu et al.

(10) Patent No.: US 10,483,697 B2
(45) Date of Patent: Nov. 19, 2019

(54) ELECTRICAL CONNECTOR HAVING TRANSFORMER WITH WINDING WIRES OF DIFFERENT DIAMETERS

(71) Applicant: FOXCONN INTERCONNECT TECHNOLOGY LIMITED, Grand Cayman (KY)

(72) Inventors: Yong-Chun Xu, Kunshan (CN); Chih-Ching Hsu, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/907,309

(22) Filed: Feb. 28, 2018

(65) Prior Publication Data
US 2018/0248320 A1    Aug. 30, 2018

(30) Foreign Application Priority Data
Feb. 28, 2017 (CN) .......................... 2017 1 0109776

(51) Int. Cl.
| | |
|---|---|
| H01R 13/60 | (2006.01) |
| H01R 13/66 | (2006.01) |
| H01F 27/28 | (2006.01) |
| H01F 27/24 | (2006.01) |
| H01F 30/16 | (2006.01) |

(Continued)

(52) U.S. Cl.
CPC ......... *H01R 13/6633* (2013.01); *H01F 27/24* (2013.01); *H01F 27/2823* (2013.01); *H01F 27/2895* (2013.01); *H01F 30/16* (2013.01);

*H01F 27/29* (2013.01); *H01R 13/665* (2013.01); *H01R 24/64* (2013.01)

(58) Field of Classification Search
CPC ... H01R 13/6633; H01R 13/665; H01F 27/24; H01F 27/29; H01F 27/2823
USPC ................................................ 439/38, 620.07
See application file for complete search history.

(56) References Cited

U.S. PATENT DOCUMENTS 5,280,648 A * 1/1994 Dobrovolny ......... H03D 9/0675
                                                                  327/105
6,225,757 B1 * 5/2001 Brosius, IV ........... H05B 41/18
                                                                  315/240

(Continued)

FOREIGN PATENT DOCUMENTS

| CN | 103325543 A | * | 9/2013 |
| CN | 203338924 U | * | 12/2013 |
| CN | 103578717 | | 10/2016 |

*Primary Examiner* — Abdullah A Riyami
*Assistant Examiner* — Vladimir Imas
(74) *Attorney, Agent, or Firm* — Wei Te Chung; Ming Chieh Chang

(57) ABSTRACT

An electrical connector includes: an insulative housing; and an inserting module positioned in the insulative housing and including a transformer, the transformer comprising: a magnetic core having a central opening; and a first and second wire groups each including plural wires, each wire having a central portion, a first end, and an opposite second end, the central portions of each wire group wound around the magnetic core through the central opening, wherein the first and second wire groups joint to function as a primary winding and a secondary winding of the transformer, and a wire diameter of the secondary winding is greater than a wire diameter of the primary winding.

5 Claims, 7 Drawing Sheets

(51) Int. Cl.
　　　*H01F 27/29*　　　(2006.01)
　　　*H01R 24/64*　　　(2011.01)

(56) References Cited

U.S. PATENT DOCUMENTS

| | | | | |
|---|---|---|---|---|
| 6,506,299 | B1* | 1/2003 | Pandolfo | C02F 1/485 |
| | | | | 204/660 |
| 9,502,829 | B2 | 11/2016 | Chen | |
| 2007/0040645 | A1* | 2/2007 | Sedio | H01F 19/06 |
| | | | | 336/232 |
| 2008/0197959 | A1* | 8/2008 | Buckmeier | H01F 17/06 |
| | | | | 336/107 |
| 2009/0186526 | A1* | 7/2009 | Xu | H01R 13/6658 |
| | | | | 439/620.22 |
| 2009/0253299 | A1* | 10/2009 | Zhang | H01R 13/65802 |
| | | | | 439/607.55 |
| 2010/0045420 | A1* | 2/2010 | Buckmeier | H01F 17/062 |
| | | | | 336/221 |
| 2011/0053418 | A1* | 3/2011 | Margulis | H01R 13/719 |
| | | | | 439/620.07 |
| 2011/0167869 | A1* | 7/2011 | Geers | B01D 53/002 |
| | | | | 62/637 |
| 2012/0304462 | A1* | 12/2012 | Wei | H01F 41/0629 |
| | | | | 29/874 |
| 2012/0315794 | A1* | 12/2012 | Chen | H01R 13/514 |
| | | | | 439/620.07 |
| 2012/0322309 | A1* | 12/2012 | Xu | H01F 17/062 |
| | | | | 439/620.06 |

* cited by examiner

US 10,483,697 B2

ELECTRICAL CONNECTOR HAVING TRANSFORMER WITH WINDING WIRES OF DIFFERENT DIAMETERS

BACKGROUND OF THE INVENTION

1. Field of the Invention

The present invention relates to an electrical connector that includes an inserting module having a transformer with primary and second windings of different wire diameters.

2. Description of Related Art

It is well known to design a transformer based on parameters such as power rating, voltage level (primary and secondary), current s on both sides, primary and secondary coils wire diameter/size, iron core area, numbers of turns (primary and secondary), etc.

U.S. Pat. No. 9,502,829, issued on Nov. 22, 2016, discloses an electrical connector that includes a transformer comprising a magnetic core and a first and second wire groups each including four wires, each wire having a central portion, a first end, and an opposite second end, the central portions being twisted together and wound around the magnetic core through the central opening, wherein the first and second wire groups joint to function as a primary winding and a secondary winding of the transformer, and a wire diameter of the secondary winding is same as a wire diameter of the primary winding. To achieve higher power rating while avoiding temperature rise essentially requires to lower the corresponding resistance by increasing the diameter of the corresponding wires. Anyhow, by increasing wire diameters of both the primary winding and the secondary winding, the size of the magnetic core may not accommodate or endure such increase of wire diameter without compromising automatic wire winding operation.

SUMMARY OF THE INVENTION

An electrical connector comprises: an insulative housing; and an inserting module positioned in the insulative housing and including a transformer, the transformer comprising: a magnetic core having a central opening; and a first and second wire groups each including plural wires, each wire having a central portion, a first end, and an opposite second end, the central portions of each wire group wound around the magnetic core through the central opening, wherein the first and second wire groups joint to function as a primary winding and a secondary winding of the transformer, and a wire diameter of the secondary winding is greater than a wire diameter of the primary winding.

DETAILED DESCRIPTION OF THE PREFERRED EMBODIMENT

Referring to FIGS. 4-7, an electrical connector (modular jack) 500 according to the present invention is shown. The electrical connector 500 has an insulative housing 5, an inserting module installed into the insulative housing 5 along a back-to-front direction, and a shielding shell surrounding the insulative housing 5. The insulative housing 5 includes plural ports each configured to receive a respective plug connector (RJ45). The insulative housing 5, the inserting module, and the shielding shell are all of generally known designs. The inserting module also includes a printed circuit board assembly (PCBA) having a PCB 40, a plurality of transformers 100 mounted to one side of the PCB 5, and a plurality of common mode chokes (CMCs) 200 mounted to the other side of the PCB 40, as well as other necessary components such as capacitors and resistors that are well known in this art. The transformer 100 is coupled to the CMC 200 via conductive paths of the PCB 5.

Figure 7:
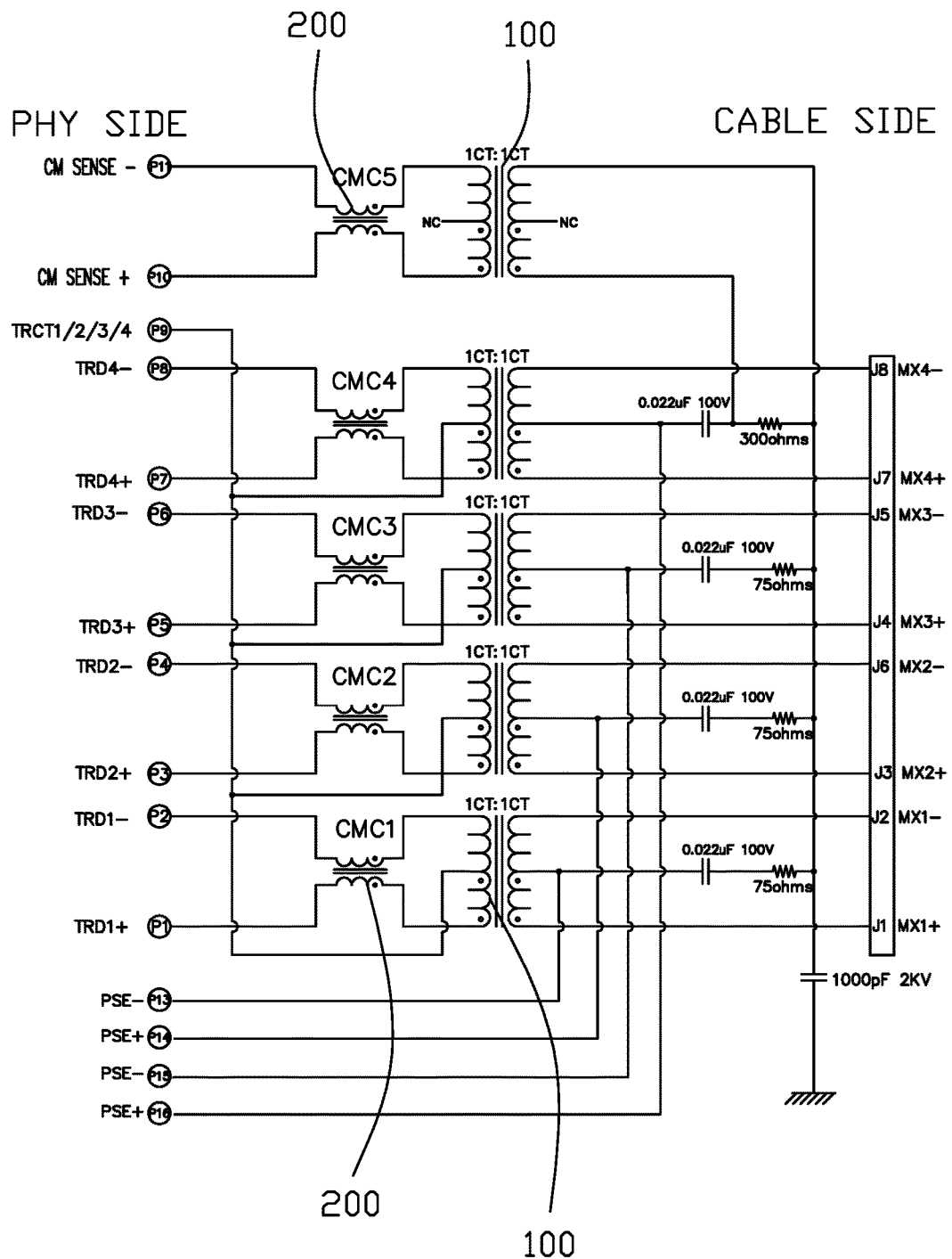
FIG. 7 is a schematic circuit diagram of the electrical connector.

Referring to FIG. 7, the electrical connector 500 includes five transformers 100 and five CMCs 200. One center tap NC of one transformer 100 is not electrically connected to any capacitor, and this one transformer is used for detecting channel.

Figure 1:
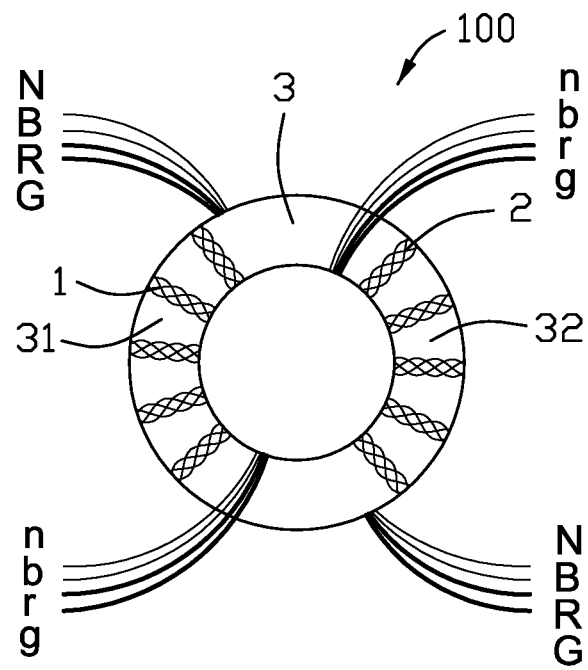
FIG. 1 is a plan view of a transformer of an electrical connector in accordance with the present invention.
Figure 2:
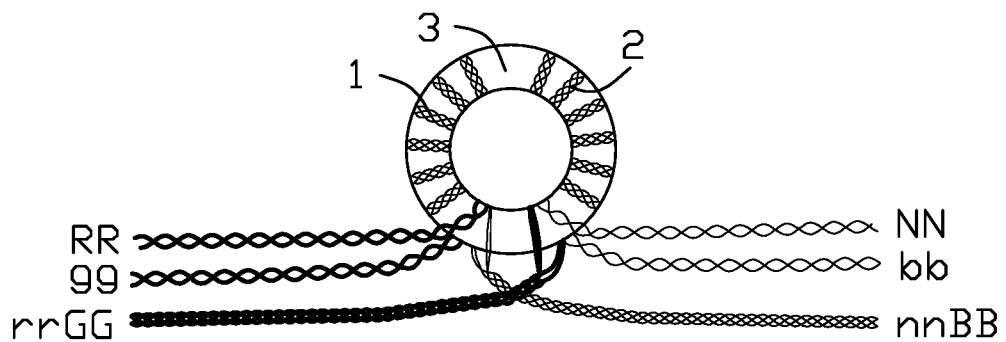
FIG. 2 is another plan view of the transformer with wire ends thereof twisted.
Figure 3:
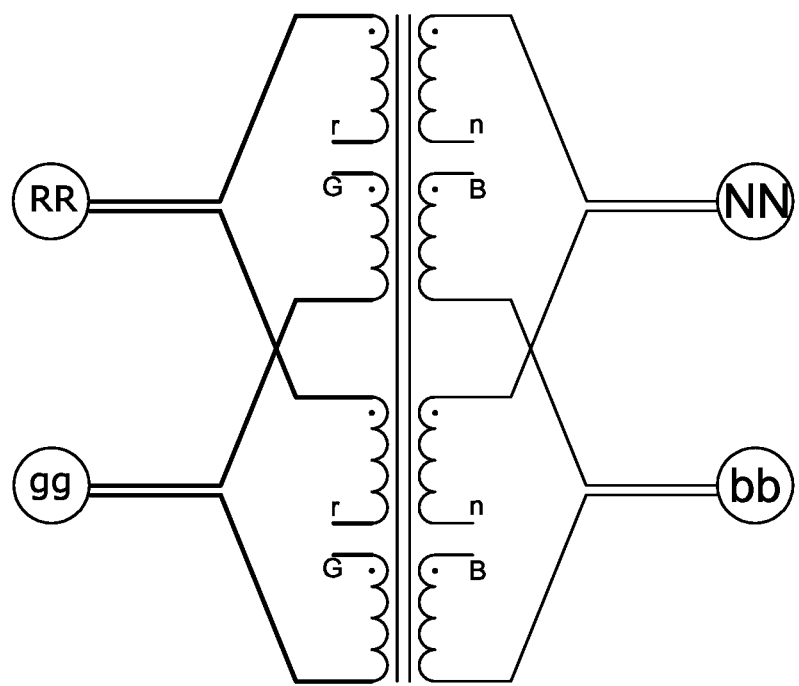
FIG. 3 is a schematic view of the transformer.
Figure 4:
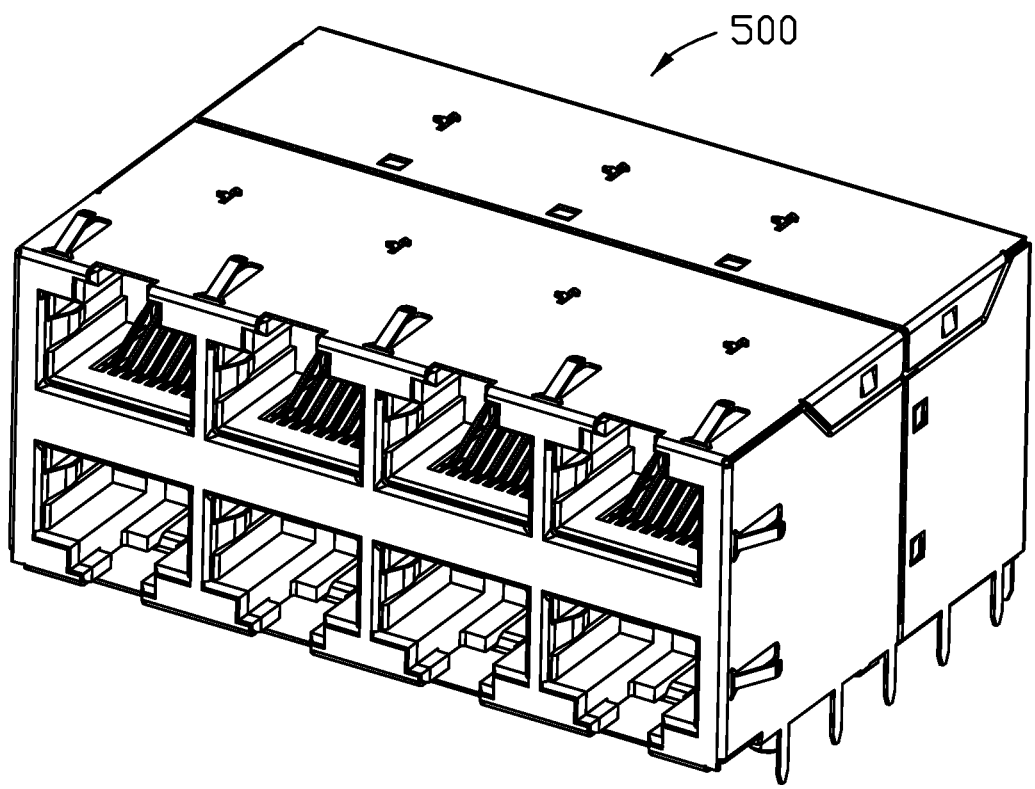
FIG. 4 is a perspective view of the electrical connector.
Figure 5:
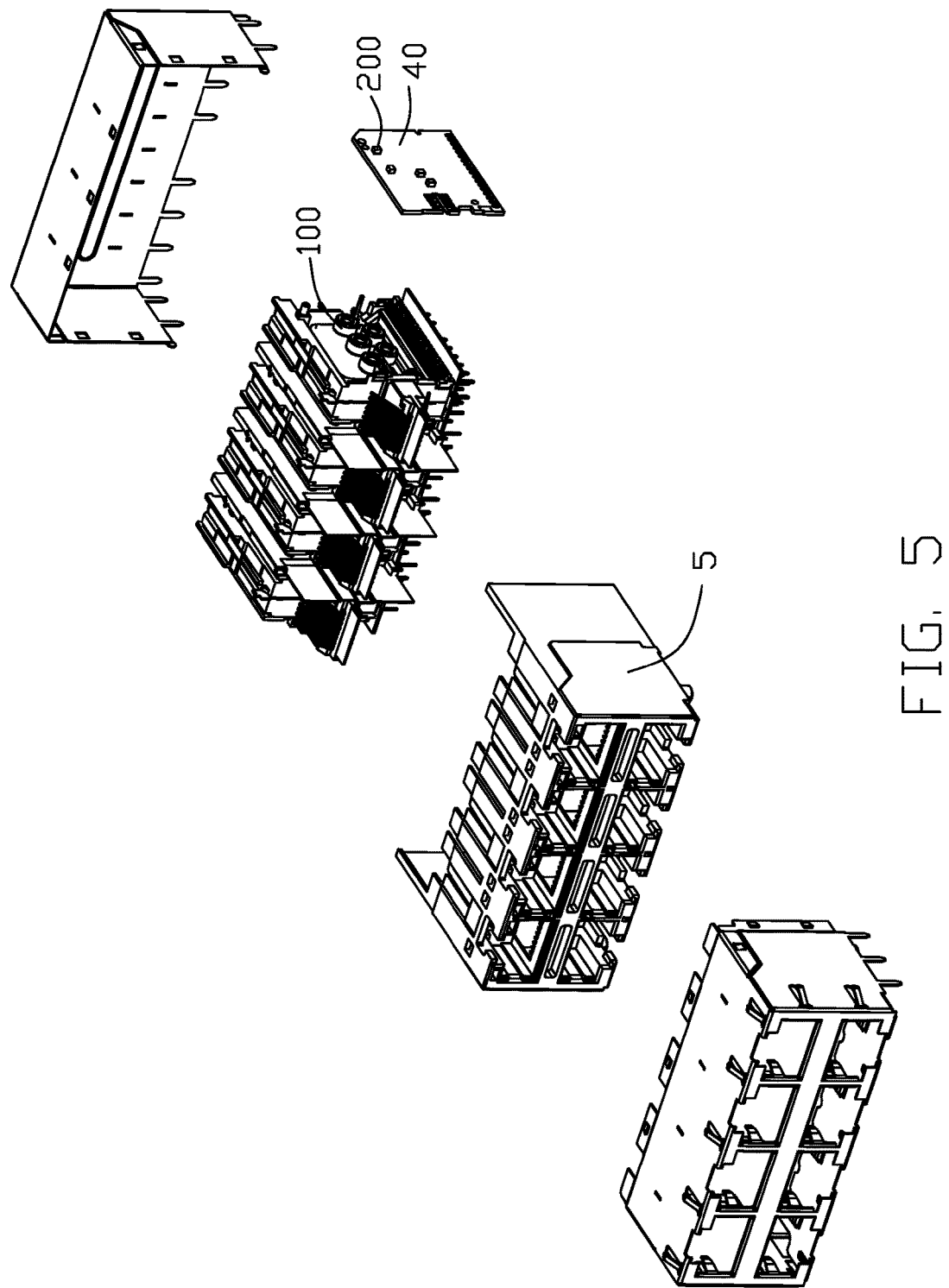
FIG. 5 is an exploded view of the electrical connector.
Figure 6:
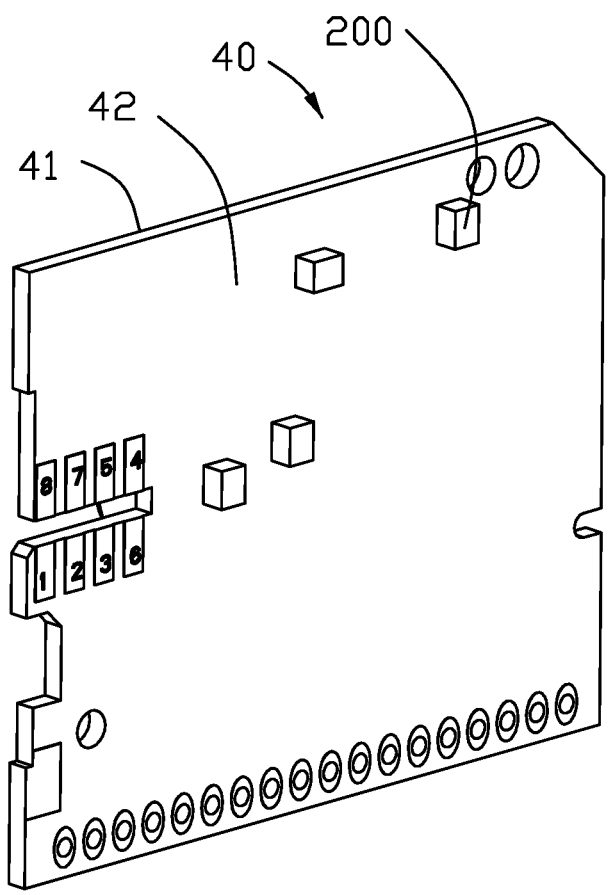
FIG. 6 is a perspective view of a printed circuit board of the electrical connector.

Referring to FIGS. 1-3, the transformer 100 includes a magnetic core 3, a first wire group 1, and a second wire group 2. The magnetic core 3 has a first and second faces, and a central opening extending perpendicular to the first and second faces. Each of the first and second wire groups 1, 2 is formed of four wires with different colors (Natural, Blue, Red, Green). The first wire group 1 includes four wires each having a central portion, a first end (NBRG), and an opposite second end (nbrg), and the central portions are twisted together and wound around the magnetic core 3 in one direction through the central opening. Similarly, the second wire group 2 includes four wires each having a central portion, a first end (NBRG), and an opposite second end (nbrg), and the central portions are twisted together and wound around the magnetic core 3 in one direction through the central opening. The magnetic core 3 includes a left half 31 and a right half 32. The central portion of first wire group 1 is only wound around the left half 31. The central portion of second wire group 2 is only wound around the right half 32. The first wire group 1 and the second wire group 2 are wound along a same direction along the magnetic core 3.

As shown in FIGS. 1-2, the first end (NBRG) of the first wire group 1 and the second end (nbrg) of the second wire group 2 are pulled from top-to-bottom (i.e., in the sense of viewing at the drawing sheet, from FIG. 1 to FIG. 2) for twisting with the second end (nbrg) of the first wire group 1 and the first end (NBRG) of the second wire group 2 to form input ends (NN, bb), output ends (RR, gg), and center taps (rrGG, nnBB).

As shown in FIGS. 2-3, the first and second wire groups 1, 2 joint to function as a primary winding and a secondary winding of the transformer. The wire ends (NBRG, nbrg) of the first wire group 1 and the wire ends (NBRG, nbrg) of the second wire group 2 are twisted to form input ends (NN, bb), output ends (RR, gg), and center taps (GGrr, BBnn) of the transformer 100.

In this embodiment of the present invention, the first wire group 1 of the transformer 100 includes two wires of greater diameters than the other two wires, so does the first wire group 2. After twisting wire ends to form input and output ends and center taps and jointing the first and second wire groups to function as primary and second windings, a transformer is obtained where a wire diameter of the secondary winding is greater than a wire diameter of the primary winding. The spirit of the invention is essentially to only increase the diameter of the secondary winding due to the limited space of the predetermined size of the magnetic ring type core on which both the primary winding and the second winding are applied. Understandably, disregarding how the first wire group and the second wire ground are arranged or amounted, increasing the diameter of all the secondary winding rather than that of the primary winding is the feature of the invention, compared with the same diameter of both the primary winding and the secondary winding as shown in the aforementioned U.S. Pat. No. 9,502,829. In addition, as shown in FIGS. 1-3 and 7, the number of turns in the primary winding is same with the number of turns in the secondary winding. In FIG. 7, the circuits connected to PSE− (P13), PSE+ (P14), PSE− (P15) and PSE+ (P16) represent power sourcing equipments, and the center taps of the secondary winding, which are located on the cable side opposite to the physical(phy) side, are electrically connected to the circuits which are derived from the PSE− and PSE+. As shown in FIG. 7, there are two pairs of PSEs and each pair includes a positive power source and a negative power source. Those two pairs of PSEs are respectively connected to the center taps of the corresponding secondary windings of the four transformers 100.

What is claimed is:

1. An electrical connector comprising:
an insulative housing; and
an inserting module positioned in the insulative housing and including a transformer, the transformer comprising:
a toroidal magnetic core having a central opening; and
a first and second wire groups each including plural wires, each wire having a central portion, a first end, and an opposite second end, the central portions of each wire group wound around the magnetic core through the central opening; wherein
the first and second wire groups joint to function as a primary winding and a secondary winding of the transformer, and a wire diameter of each of the plural wires of the secondary winding is greater than a wire diameter of each of the plural wires of the primary winding.

2. The electrical connector as claimed in claim 1, wherein the first and second ends of the first and second wire groups are respectively twisted as input ends, output ends, and center taps of the transformer.

3. The electrical connector as claimed in claim 1, wherein the magnetic core includes a left half and a right half, the central portion of the first wire group only wound around the left half, the central portion of the second wire group only wound around the right half.

4. The electrical connector as claimed in claim 1, wherein the center tap of the secondary winding is electrically connected to corresponding a circuit derived from a power sourcing equipment (PSE).

5. The electrical connector as claimed in claim 4, wherein the printed circuit board is divided into opposite cable side and physical side, and the secondary winding is closer to the cable side while the primary winding is closer to the physical side.

* * * * *